United States Patent [19]

Ichikawa et al.

[11] Patent Number: 4,559,604
[45] Date of Patent: Dec. 17, 1985

[54] PATTERN RECOGNITION METHOD

[75] Inventors: Akira Ichikawa, Musashino; Hiroko Matsuzaka, Kokubunji, both of Japan

[73] Assignee: Hitachi, Ltd., Tokyo, Japan

[21] Appl. No.: 304,154

[22] Filed: Sep. 21, 1981

[30] Foreign Application Priority Data

Sep. 19, 1980 [JP] Japan .................. 55-129327
May 22, 1981 [JP] Japan .................. 56-76564

[51] Int. Cl.$^4$ .............................. G10L 1/00
[52] U.S. Cl. .................... 364/513.5; 381/43
[58] Field of Search .................. 381/41–44; 364/513, 513.5; 382/27, 30, 36–38

[56] References Cited

U.S. PATENT DOCUMENTS

| | | | |
|---|---|---|---|
| 3,265,814 | 8/1966 | Maeda et al. | 381/43 |
| 3,643,215 | 2/1972 | Ingham et al. | 382/37 |
| 3,679,830 | 7/1972 | Uffelman et al. | 381/41 |
| 3,946,157 | 3/1976 | Dreyfus | 381/43 |
| 4,027,284 | 5/1977 | Hoshino et al. | 382/38 |
| 4,100,370 | 7/1978 | Suzuki et al. | 381/42 |
| 4,286,115 | 8/1981 | Sakoe | 381/43 |
| 4,292,471 | 9/1981 | Kuhn et al. | 381/42 |
| 4,394,538 | 7/1983 | Warren et al. | 381/43 |
| 4,400,828 | 8/1983 | Pirz et al. | 382/30 |

Primary Examiner—E. S. Matt Kemeny
Attorney, Agent, or Firm—Antonelli, Terry & Wands

[57] ABSTRACT

In a machine implemented voice recognition method, as a first step speech signals are analyzed for feature vectors which are used to compare input signals with pre-stored reference signals. Patterns of any suitable form are used to calculate a similarity distance measure $d_{IJ}$ which is tested against a threshold to select likely candidates as a first step. A second step selects the most likely candidate by using "common nature" parameters of phonemes such as relative occurrence. Five embodiments of the second step are disclosed, each using a "common nature" criteria of inference to infer (select) the most likely candidate:

(1) $d'_I = W_1 \cdot W_2 \cdot W_3$ where W is a weighting factor;
(2) $d''_I = C_I d'_I$ where $C_I$ is a correction factor;
(3) max $p(i,j)$ where $p(i)$ is the probability of occurrence of the $i^{th}$ phoneme;
(4) min $d'_{ij}$ as a variation of max $p(i,j)$; and
(5) $N(i)$ is the numerical similarity of the common characteristics of the selected candidates.

14 Claims, 8 Drawing Figures

| ORDER | CONSONANT | CONSONANTS OF SAME "MANNER OF PRODUCTION" | CONSONANTS OF SAME "PLACE OF ARTICULATION" | NUMBER (N) |
|---|---|---|---|---|
| 1 | /k/ | /t/, /p/ | NONE | 3 |
| 2 | /d/ | NONE | /z/, /t/, /s/ | 4 |
| 3 | /z/ | NONE | /d/, /t/, /s/ | 4 |
| 4 | /t/ | /k/, /p/ | /d/, /z/, /s/ | 6 |
| 5 | /p/ | /k/, /t/ | NONE | 3 |
| 6 | /s/ | NONE | /d/, /z/, /t/ | 4 |

FIG. 1

| ORDER | CONSONANT | CONSONANTS OF SAME "MANNER OF PRODUCTION" | CONSONANTS OF SAME "PLACE OF ARTICULATION" | NUMBER (N) |
|---|---|---|---|---|
| 1 | /k/ | /t,p/ | NONE | 3 |
| 2 | /d/ | NONE | /z,t,s/ | 4 |
| 3 | /z/ | NONE | /d,t,s/ | 4 |
| 4 | /t/ | /k,p/ | /d,z,s/ | 6 |
| 5 | /p/ | /k,t/ | NONE | 3 |
| 6 | /s/ | NONE | /d,z,t/ | 4 |

FIG. 3

| ORDER | CONSONANT | $d_{IJ}$ | $d'_I$ | $d''_I$ |
|---|---|---|---|---|
| 1 | /t/ | 1.40(ERROR) | 1.25 | 1.32 |
| 2 | /z/ | 1.56 | 1.19(ERROR) | 1.31 |
| 3 | /s/ | 1.57 | 1.23 | 1.23(CORRECT) |
| 4 | /d/ | 1.60 | 1.22 | 1.42 |

INPUTTED VOICE = /s/

FIG. 2

→ PHONEME IN INPUTTED PATTERN (i)

| I/J | P | Py | t | ch | ts | K | Ky | S | Sh | h | hy | b | by | d | dʒ (j) | dz (") | g | gy | Z | m | my | n | ny | ŋ | ŋy | r | ry |
|---|---|---|---|---|---|---|---|---|---|---|---|---|---|---|---|---|---|---|---|---|---|---|---|---|---|---|---|
| P | 100 | 80 | 80 | 60 | 40 | 60 | 40 | 60 | 40 | 60 | 40 | 80 | 60 | 60 | 0 | 20 | 40 | 20 | 40 | 60 | 40 | 40 | 20 | 20 | 0 | 20 | 0 |
| Py | 80 | 100 | 60 | 80 | 20 | 40 | 60 | 40 | 60 | 40 | 60 | 60 | 80 | 40 | 20 | 0 | 20 | 40 | 20 | 40 | 60 | 20 | 40 | 0 | 20 | 0 | 20 |
| t | 80 | 60 | 100 | 80 | 40 | 40 | 20 | 80 | 60 | 40 | 20 | 60 | 40 | 80 | 20 | 40 | 20 | 0 | 60 | 40 | 20 | 60 | 40 | 0 | 0 | 40 | 20 |
| Ch | 60 | 80 | 80 | 100 | 40 | 20 | 40 | 60 | 80 | 20 | 40 | 40 | 60 | 60 | 40 | 20 | 0 | 20 | 40 | 20 | 40 | 40 | 60 | 0 | 0 | 20 | 40 |
| ts | 40 | 20 | 40 | 40 | 100 | 40 | 20 | 80 | 60 | 40 | 20 | 20 | 0 | 40 | 60 | 80 | 20 | 0 | 60 | 0 | 0 | 20 | 0 | 0 | 0 | 40 | 20 |
| K | 60 | 40 | 40 | 20 | 40 | 100 | 80 | 20 | 0 | 40 | 20 | 40 | 20 | 20 | 0 | 20 | 80 | 60 | 0 | 20 | 0 | 0 | 0 | 60 | 40 | 0 | 0 |
| Ky | 40 | 60 | 20 | 40 | 20 | 80 | 100 | 0 | 20 | 20 | 40 | 20 | 40 | 0 | 20 | 0 | 60 | 80 | 0 | 0 | 20 | 0 | 0 | 40 | 60 | 0 | 0 |
| S | 60 | 40 | 80 | 60 | 80 | 20 | 0 | 100 | 80 | 60 | 40 | 40 | 20 | 60 | 40 | 60 | 0 | 0 | 80 | 20 | 0 | 40 | 20 | 0 | 0 | 60 | 40 |
| Sh | 40 | 60 | 60 | 80 | 60 | 0 | 20 | 80 | 100 | 60 | 80 | 20 | 40 | 40 | 60 | 40 | 0 | 0 | 60 | 0 | 20 | 20 | 40 | 0 | 0 | 40 | 60 |
| h | 60 | 40 | 40 | 20 | 40 | 40 | 20 | 60 | 60 | 100 | 80 | 60 | 40 | 40 | 20 | 40 | 20 | 0 | 60 | 40 | 20 | 20 | 0 | 0 | 0 | 40 | 20 |
| hy | 40 | 60 | 20 | 40 | 20 | 20 | 40 | 40 | 80 | 80 | 100 | 40 | 60 | 20 | 40 | 40 | 0 | 20 | 40 | 20 | 40 | 0 | 20 | 0 | 0 | 20 | 40 |
| b | 80 | 60 | 60 | 40 | 20 | 40 | 20 | 40 | 20 | 60 | 40 | 100 | 80 | 80 | 20 | 40 | 60 | 40 | 60 | 80 | 60 | 60 | 40 | 40 | 20 | 40 | 20 |
| by | 60 | 80 | 40 | 60 | 0 | 20 | 40 | 20 | 40 | 40 | 60 | 80 | 100 | 60 | 40 | 20 | 40 | 60 | 40 | 60 | 80 | 40 | 60 | 20 | 40 | 20 | 40 |
| d | 60 | 40 | 80 | 60 | 40 | 20 | 0 | 60 | 40 | 40 | 20 | 80 | 60 | 100 | 40 | 60 | 40 | 20 | 80 | 60 | 40 | 80 | 60 | 20 | 0 | 60 | 40 |
| dʒ | 0 | 20 | 20 | 40 | 60 | 0 | 20 | 40 | 60 | 20 | 40 | 20 | 40 | 40 | 100 | 80 | 20 | 40 | 60 | 0 | 20 | 20 | 40 | 0 | 20 | 40 | 60 |
| dz | 20 | 0 | 40 | 20 | 80 | 20 | 0 | 60 | 40 | 40 | 40 | 40 | 20 | 60 | 80 | 100 | 40 | 20 | 80 | 20 | 0 | 40 | 20 | 20 | 0 | 60 | 40 |
| g | 40 | 20 | 20 | 0 | 20 | 80 | 60 | 0 | 0 | 20 | 0 | 60 | 40 | 40 | 20 | 40 | 100 | 80 | 20 | 40 | 20 | 20 | 0 | 80 | 60 | 60 | 40 |
| gy | 20 | 40 | 0 | 20 | 0 | 60 | 80 | 0 | 0 | 0 | 20 | 40 | 60 | 20 | 40 | 20 | 80 | 100 | 0 | 0 | 20 | 0 | 20 | 60 | 80 | 20 | 40 |
| Z | 40 | 20 | 60 | 40 | 60 | 0 | 0 | 80 | 60 | 60 | 40 | 60 | 40 | 80 | 60 | 80 | 20 | 0 | 100 | 40 | 20 | 60 | 40 | 0 | 0 | 80 | 60 |
| m | 60 | 40 | 40 | 20 | 0 | 20 | 0 | 20 | 0 | 40 | 20 | 80 | 60 | 60 | 0 | 20 | 40 | 0 | 40 | 100 | 80 | 80 | 60 | 60 | 40 | 40 | 20 |
| my | 40 | 60 | 20 | 40 | 0 | 0 | 20 | 0 | 20 | 20 | 40 | 60 | 80 | 40 | 20 | 0 | 20 | 20 | 20 | 80 | 100 | 60 | 80 | 40 | 60 | 20 | 40 |
| n | 40 | 20 | 60 | 40 | 20 | 0 | 0 | 40 | 20 | 20 | 0 | 60 | 40 | 80 | 20 | 40 | 20 | 0 | 60 | 80 | 60 | 100 | 80 | 40 | 20 | 80 | 60 |
| ny | 20 | 40 | 40 | 60 | 0 | 0 | 0 | 20 | 40 | 0 | 20 | 40 | 60 | 60 | 40 | 20 | 0 | 20 | 40 | 60 | 80 | 80 | 100 | 20 | 40 | 60 | 80 |
| ŋ | 20 | 0 | 0 | 0 | 0 | 60 | 40 | 0 | 0 | 0 | 0 | 40 | 20 | 20 | 0 | 20 | 80 | 60 | 0 | 60 | 40 | 40 | 20 | 100 | 80 | 0 | 0 |
| ŋy | 0 | 20 | 0 | 0 | 0 | 40 | 60 | 0 | 0 | 0 | 0 | 20 | 40 | 0 | 20 | 0 | 60 | 80 | 0 | 40 | 60 | 20 | 40 | 80 | 100 | 0 | 0 |
| r | 20 | 0 | 40 | 20 | 40 | 0 | 0 | 60 | 40 | 40 | 20 | 40 | 20 | 60 | 40 | 60 | 60 | 20 | 80 | 40 | 20 | 80 | 60 | 0 | 0 | 100 | 80 |
| ry | 0 | 20 | 20 | 40 | 20 | 0 | 0 | 40 | 60 | 20 | 40 | 20 | 40 | 40 | 60 | 40 | 40 | 40 | 60 | 20 | 40 | 60 | 80 | 0 | 0 | 80 | 100 |
| CI | 10.8 | 10.2 | 10.6 | 10.2 | 7.6 | 7.2 | 6.6 | 10.0 | 10.8 | 8.8 | 8.6 | 11.6 | 11.6 | 11.6 | 8.2 | 9.0 | 8.8 | 7.4 | 11.0 | 9.2 | 9.0 | 10.0 | 9.4 | 6.0 | 5.8 | 9.4 | 8.8 |

↓ PHONEME IN STANDARD PATTERN (j)

|  j  | K | P |
|---|---|---|
| i |   |   |
| K | 1.52 | 1.80 |
| P | 2.05 | 1.70 |

|   | g | b | d |
|---|---|---|---|
|   | 1.92 | 2.09 | 2.03 |
|   | 2.50 | 1.98 | 2.19 |

| g | 2.72 | 3.28 |
|---|---|---|
| b | 2.56 | 3.17 |
| d | 2.91 | 2.73 |
| m |   |   |

| 1.56 | 2.53 | 2.55 |
|---|---|---|
| 1.92 | 1.64 | 1.95 |
| 1.84 | 2.16 | 1.55 |

PATTERN RECOGNITION METHOD

BACKGROUND OF THE INVENTION

1. Field of the Invention:

The present invention relates to a pattern recognition method and, particularly to an improved pattern recognition method which precisely recognizes confusing characters, and phoneme that constitutes voices and corresponding to each symbol constituting a language.

2. Description of the Prior Art:

According to a conventional pattern recognition method such as a method for recognizing letters and voices, an input pattern and a standard pattern are subjected to comparison, and a pattern having a category name of the standard pattern having an optimum degree of identification is introduced.

In recognizing the letters, when, for example, a Chinese character "大" (large) is introduced, the comparison can be generally performed well with respect to the following Chinese characters "犬" (dog) or "太" (thick), in addition to a standard pattern Chinese character "大" (large). In recognizing voices, when, for example, the sound /t/ is introduced, the comparison can be usually performed well with respect to the same voiceless stop consonants such as /p/ or /k/ or with respect to /d/, /z/, or /s/ having the same place of articulation. Therefore, there is a great probability for developing erroneous recognition among such similar patterns, and the ability to perform accurate recognition is decreased.

In recognizing phonemes, for example, in voice produced by a physical phenomenon such as vibration of the vocal organs, the phonemes which constitute the voice produced under limited physical conditions such as length of the vocal organs, may appear to be greatly affected by the preceding or succeeding phoneme and the speed of speech.

Therefore, it is very difficult to precisely recognize the phoneme.

In order to overcome the above difficulty, a method was proposed, according to which a spoken word containing deformed phonemes was compared as a practical recognition unit with a standard pattern.

According to the above method, however, it was necessary to prepare standard patterns of such large units as spoken words consisting of a combination of phonemes and, hence, it was necessary to store in the memory the standard patterns related to spoken words that were to be recognized. Since the memory of a tremendous capacity was necessary, it was virtually impossible to construct a voice recognizing apparatus which is capable of recognizing any voices like a so-called voice typewriter.

In order to recognize any voices, therefore, it becomes an essential requirement to perform the recognition on the phoneme level.

As mentioned above, however, the recognition on the phoneme level presents the following problems:

(1) It becomes difficult to perform the recognition as the phoneme is deformed.

(2) A phoneme has a length considerably shorter than that of a word, which causes confusion among different phonemes.

(3) Voice is continuously produced with the passage of time, and it is necessary to cut out the phoneme as a sectional pattern from the continuous voice pattern. It is, however, very difficult to properly cut out the sectional patterns.

With respect to the above-referenced third problem a system called the continuous DP (dynamic programming) matching method has been proposed in order to continuously perform the matching of the introduced voice pattern with the standard pattern without the need of cutting the continuously produced voice pattern after a predetermined period of time, and the effectiveness of the continuous DP matching method has been confirmed. See Continuous Speech Recognition by Continuous DP Matching" by Ryuichi Oka, Technical Report of Acoustic Society of Japan, S78-20.

To cope with the above-referenced first and second problems, on the other hand, methods have been proposed in order to:

(i) Increase the kinds of characteristic parameters so that slightest differences among the phonemes can be detected;

(ii) Prepare standard patterns to emphasize consonant portions of the phonemes: and (iii) Improve the matching method so that it is less affected by the deformed phonemes.

None of the above methods, however, have produced satisfactory results.

SUMMARY OF THE INVENTION

The object of the present invention is to provide a pattern recognition method which is capable of properly recognizing even confusing patterns based upon the above-mentioned facts, i.e., to provide a pattern recognition method which eliminates the above-mentioned first and second problems and in recognizing phonemes in order to enhance the recognition factor of the voice patterns.

In order to accomplish the above object, according to the present invention, the standard pattern of the highest certainty obtained by the matching of an unknown pattern with the standard pattern, is decided by utilizing the matching results of other standard patterns inclusive of resembling patterns as recognized information, in order to reduce erroneous recognition and to increase the recognition factor.

In accordance with the method of the invention, an input pattern is compared with standard patterns to produce identified values of each comparison of the input pattern with the standard patterns, a plurality of candidates are selected that are likely to be the input pattern based upon the identified values; and an input pattern is inferred based upon a predetermined criterion of inference. The predetermined criterion of inference is different than the criteria for selecting the plurality of candidates and utilizes the nature of the selected candidates and the commonness of each of the selected candidates with the other candidates. In accordance with the invention, there are four preferred methods for determining the criterion of inference.

The principle of the present invention will be described below with reference to phoneme recognition based upon the pattern matching method.

In general, phonemes are not totally unrelated to each other, and there are predetermined relationship among the phonemes. Therefore, the phonemes can be classified into several groups depending upon their common natures. According to the above classifications, the phonemes belong to several groups depending upon the natures. According to the results of recognition experiments conducted by the inventors of the present invention, the following facts were ascertained:

(a) A distance obtained by comparing a phoneme group having a common nature with the standard pattern is smaller than a distance obtained by comparing a phoneme group without a common nature with the standard pattern.

(b) Since each phoneme has a small amount of information, even a slight deformation causes the distance which is the result of the comparison to be greatly varied. There is, however, a predetermined upper limit in the distance, and the distance seldom varies in excess of the upper limit.

(c) When priority is given to the phonemes depending upon their distances such that the phoneme having a minimum distance as a result of the comparison is entitled to the first order in certainty, the phonemes having the highest order of certainty have, in many cases, a common nature to the phonemes that pertain to the same category, even when the order of phonemes pertaining to the category which is the same as the standard pattern is reversed relative to the order of phonemes that pertain to a different category. Conversely, the phonemes without a common nature often have small orders in certainty.

Relying upon these facts, the fundamental principle of the present invention consists of classifying the phonemes having higher orders in certainty as determined by the comparison into a plurality of groups depending upon their common natures, and specifying the phonemes that commonly belong to these groups as the input phonemes.

In this case, it is possible to increase the precision of recognition depending upon whether the phonemes having less commonness to other phonemes are located at higher positions in certainty or not.

What should be set and how it should be set as a common nature for classifying the phonemes will differ depending upon the characteristic parameters employed for the recognition and the language being discussed. However, a relatively stable classification is realized based upon the following natures:

(1) Place of articulation,
(2) Manner of production.

However, the manner of production of the sound of the [g] series of Japanese language may be either /g/ (voiced stop consonant) or /η/ (nasal consonant). Therefore, the classification based upon the above-mentioned nature is not satisfactory.

In specifically constructing an apparatus according to the invention, therefore, the phonemes should be classified depending upon the nature which is determined based upon a language or representative parameters.

BRIEF DESCRIPTION OF THE DRAWINGS

FIG. 1 is a diagram showing an example of results obtained by classifying the candidates of recognition depending upon their common natures;

FIG. 2 is a diagram illustrating quantities that represent similarity between the phonemes in the input patterns and the phonemes in the standard patterns as well as correction quantities for the phonemes in the input patterns;

FIG. 3 is a diagram showing an example of results of recognition by the first and second methods of the present invention;

DESCRIPTION OF THE PREFERRED EMBODIMENTS

Figure 4:
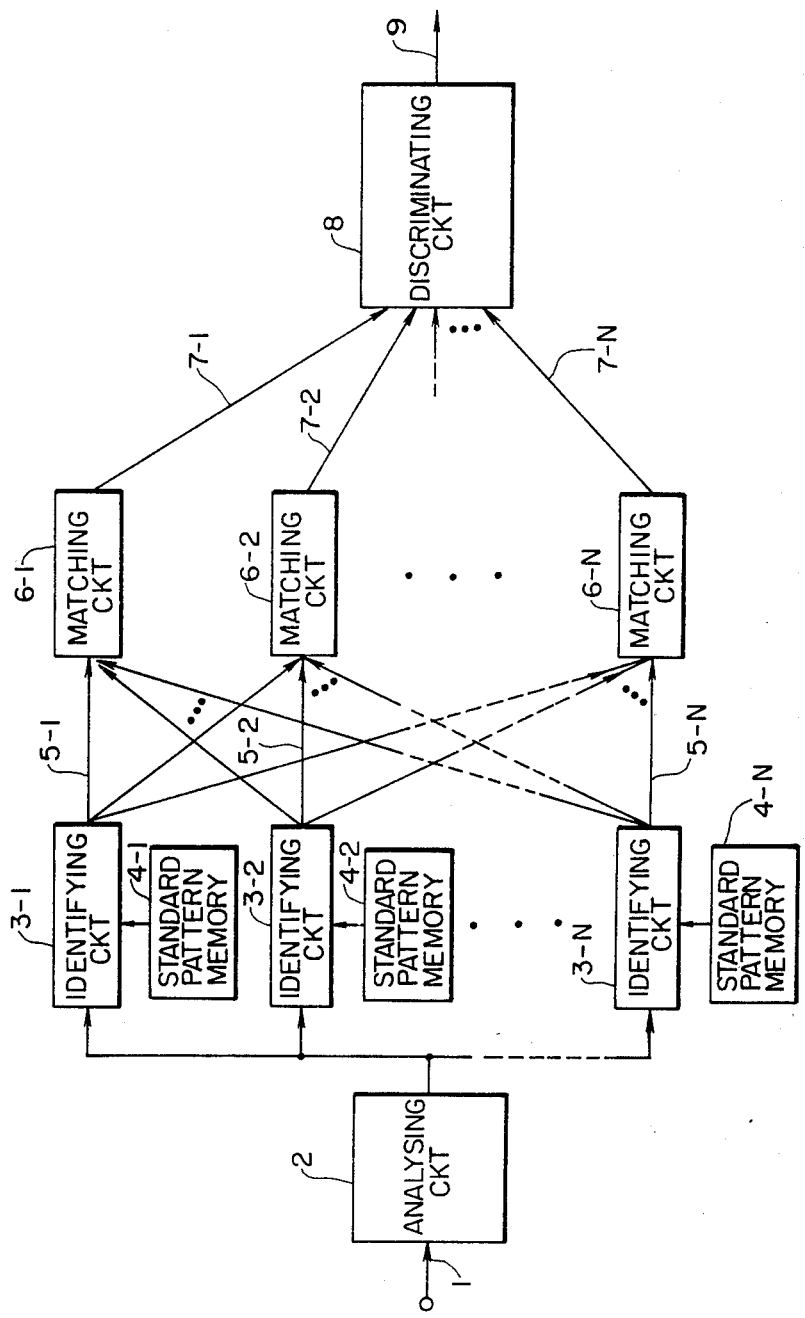
FIG. 4 is a block diagram showing the principle of a pattern recognition apparatus according to a third method of the present invention.

Embodiments of the invention will be described below in detail with reference to specific data.

First, a registered unit of a standard pattern is set to be vowel—consonant—vowel (a so-called VCV unit). This unit, however, need not be limited to the VCV unit provided it is lower than a level of linguistic signs of voices such as syllables and phonemes.

If now a word (/atataka/) is fed as an input voice, there will exist the following distances from the first place to the sixth place as the result of comparing with various VCV's that are prepared as standard patterns for recognizing the second underlined consonant /t/.

$$\left.\begin{array}{l} ①/aka/:1.53 \\ ②/ada/:1.54 \\ ③/aza/:1.58 \\ ④/ata/:1.64 \\ ⑤/apa/:1.65 \\ ⑥/asa/:1.72 \end{array}\right\} \quad (1)$$

From the above results, the consonant in the input voice according to a conventional method will be erroneously recognized as /k/ of ① which gives a minimum distance. The present invention provide a method which precludes the above defect, and extracts a first candidate /t/ as the correct answer from /ata/ which is in the fourth place from the viewpoint of distance.

According to the results of a recognition experiment conducted by the inventors of the present invention, the distance in the VCV that may be a correct answer does not become greater than a minimum distance in all VCV's by more than 0.2, when the sampling frequency of the input voice is 8 KHz, the Hamming window in the continuous non-linear matching (usually referred to as DP matching) is 20 msec., and the frame distance is 10 msec. In the above-mentioned example, based upon this result, VCV's (six distances ① to ⑥ in the relation (1)) serve as candidates of recognition having distances smaller than, $$1.53 + 0.3 = 1.83$$

which is not greater, by more than +0.3, than a minimum distance 1.53 (distance ① in the relation (1)).

According to the first method of the present invention, consonants (including consonant /t/ of correct answer) in the six VCV's extracted as candidates of recognition are examined for their commonness.

Therefore, the following facts can be understood.

ⓘ The /k/ and /p/ which are voiceless stop consonants, are in agreement with each other in their manner of production, and belong to the same group.

ii The /d/, /z/ and /s/ have a point of articulation at the tip of tongue, and are in agreement with each other in regard to their place of articulation, and belong to the same group.

FIG. 1 shows six consonants which are candidates from the viewpoint of the manner of production and the place of articulation, consonants which can be classified into the same group, and the total number (N) in each group.

According to FIG. 1, there are the greatest number of consonants that can be classified into the same group as the consonant /t/ of the correct answer. There are two consonants from the viewpoint of the manner of production, and three consonants from the viewpoint of the place of articulation. The total number N inclusive of /t/ is 6.

Therefore, if the voice which is introduced is inferred with the magnitude of N as a criterion for inference, it is possible to obtain a correctly recognized result.

Next, in order to enhance the precision of recognition, new distances reflecting the classified results of FIG. 1 are found from the distances that are obtained by the comparison, and voices that are introduced are inferred with the thus found distances as criteria for inference.

Referring to the relation (1), if a distance of the i-th order is denoted by $d_i$, a minimal value among $d_1$ to $d_6$ is denoted by $d_{min}$ (1.53 of /aka/), the number of consonants of the i-th order that pertain to the same group of FIG. 1 by $N_i$, and distances of VCV's corresponding to $N_i$ consonants by $d_{ij}$ (j=1, 2 ... $N_i$) (in the case of /k/, for example, 1.53 of $d_{11}$=/aka/, 1.64 of $d_{12}$=/ata/, and 1.65 of $d_{13}$=/apa/ when i=1 and $N_1$=3), the following new distance $d_1'$ can be defined responsive to the distance of the i-th order of the relation (1).

$$d_1' = w_1 \cdot w_2 \cdot w_3 \quad (2)$$

Here, $w_1$ denotes a weighing quantity which represents increased result of recognition with the increase in the number of consonants that pertain to the same group. For instance, $$w_1 = 1/N_i \quad (3)$$

Symbol $w_2$ denotes a weighing quantity which represents increased result of recognition with the decrease in the distances that are results of comparisons. For instance, $$w_2 = 1 + d_i - d_{min} \quad (4)$$

Symbol $w_3$ denotes a weighing quantity which represents an increased result of recognition with the decrease of distances that are results of comparisons relative to VCV's that pertain to the same group. For instance, $$w_3 = \frac{1}{N_i} \sum_{j=1}^{N_i} d_{ij} \quad (5)$$

The distance $d_i'$ (i=1, 2, ... 6) of the equation (2) is calculated using weighing quantities $w_1$ to $w_3$ given by the equations (3) to (5), and are indicated as follows in the order corresponding to ① to ⑥ of the equation (1).

$$\left.\begin{array}{l}1/aka/:0.54\\2/ada/:0.41\\3/aza/:0.43\\4/ata/:0.30\\5/apa/:0.60\\6/asa/:0.42\end{array}\right\} \quad (6)$$

The distance $d_4'$ corresponding to /ata/ that serves as a correct recognition result assumes a minimal value 0.30. This verifies the effectiveness of the first method of the present invention.

According to the results of a recognition experiment conducted by the inventors of the present invention, the recognition factor of 95% can be achieved by using the distance $d_i'$ of the present invention compared with the recognition factor of 78% of the conventional method.

In the above description, it was presumed that the number of VCV's belonging to the same group is nearly equal in all of the VCV's. Some VCV's, however, may belong to the same group in reduced numbers.

With regard to such VCV's, the weight ($w_1$ of the equation (3)) based on the number of VCV's belonging to the group is modifed and is balanced, or the modification is effected depending upon whether there is any candidate having a different nature among those classified into the same group as candidates of recognition. As for the candidate having a different nature, the weighing quantity corresponding to the equations (3) to (5) and the distance $d_i''$ corresponding to $d_i'$ of the equation (2) are found depending upon the nature of the candidate, and the modification is effected depending upon the ratio $d_i'/d_i''$.

If now the likelihoodration is used, the VCV close to the average spectral characteristics tends to appear as a candidate of recognition for various VCV's and also loses the likelihoodration value correspondingly. However, since the VCV having a great deviation feature appears as a candidate only for specific groups, it is possible to modify the distance $d_i$ beforehand by utilizing the above-mentioned nature.

The above description has dealt with the method in which the degree of commonness is expressed in two steps, i.e., "1" (common) or "0" (not common), and the consonant /k/ of FIG. 1 has commoness to consonants /t/ and /p/ in regard to the manner of production and, hence, has a similarity degree 1, and has no commonness to other consonants /d/, /z/ or /s/ in regard to either the manner of production or the place of articulation and, hence, has a similarity degree 0. In other words, the above description has dealt with the method which equally handles the objects of recognition that belong to the same group relying upon the common nature. Below is mentioned a second method according to the present invention, in which the common nature is expressed by any numerical value between 0 and 1 depending upon the degree of commonness to fairly evaluate the commonness among the phonemes, and to correct the deviation in the number of similar phonemes.

First, the similarity degrees $P_{IJ}$ between the phonemes I in the input voices that are to be recognized and the phonemes J in the standard patterns, are found and are tabulated. The similarity degrees $P_{IJ}$ may be prepared relying upon the quantities phonemically defined based on common terms of discriminated features, or may be prepared utilizing the results of checking in the apparatus for recognizing the voice.

FIG. 2 tabulates specific examples of quantities corresponding to the similarity degree $P_{IJ}$. In this case, when I=J is denoted by 1, values within a range of 0 to 1 are rounded to 0.0, 0.2, 0.4, 0.6, 0.8 or 1.0, and the results are multiplied by 100.

The similarity degree $P_{IJ}$ is a quantity which represents the degree of similarity between I and J. Therefore, $(1-P_{IJ})$ can be regarded as a quantity which represents the degree of non-similarity between I and J.

The unknown voice which is introduced is now denoted by I, and is matched to the standard pattern J to utilize L distances that have the greatest similarities (in the following description, the similarity is defined by the distance $d_{IJ}$, the smaller the distance $d_{IJ}$ the greater the similarity), i.e., to utilize L distances that lie inside a predetermined threshold value. If these distances are denoted as follows in the order of increasing quantities, $$d_{I1}, d_{I2}, d_{I3}, \ldots, d_{IL} \qquad (7)$$

the unknown voice I which is introduced will be specified as the one among 1 to L.

In inferring that the unknown voice is I based upon these quantities, the precision of inference can be increased through the following processing.

First, if $$S_I = \sum_{J=1}^{L} (1 - P_{IJ}) \qquad (8)$$

is calculated, $S_I$ becomes a quantity that indicates a degree which does not mean that the input voice is I.

Moreover, the distance $d_{IJ}$ which is increased serves as a quantity that indicates an increasing degree at which I is not J.

Therefore, if $S_I$ and $d_{IJ}$ are combined together to define.

$$d_I' = \sum_{J=1}^{L} (1 - P_{IJ}) \cdot d_{IJ} \qquad (9)$$

it is considered that $d_I'$ becomes a quantity that indicates a degree at which the unknown voice is not I. By using this quantity as a criterion of inference, it is possible to infer the voice to be $I_O$ when, $$d_{IO}' = M_{in}[d_1', d_2', d_3', \ldots d_L']$$

The distance $d_I'$ calculated according to the equation (9) corresponds to $d_i'$ of the equation (2). When the weighing quantity $w_3$ of the equation (2) is found, however, the distances, $$d_{I1}, d_{I2}, d_{I3}, \ldots d_{INi}$$

which are the candidates are all equally treated as given by the equation (5).

According to the equation (9), on the other hand, the weighing $(1-P_{IJ})$ is effected for all of the candidate distances, $$d_{I1}, d_{I2}, d_{I3}, \ldots, d_{IL}$$

depending upon the similarity between I and J (J=1, 2, ..., L) to find the distance $d_I$ which is weight averaged. Therefore, it is possible to find a distance which more faithfully reflects the distance relative to the standard pattern.

In the case of the input voice I having small number of similar phonemes, the number of candidates L is small as given by the equation (7), and the distance $d_I'$ is generally large, making it difficult to perform correct recognition.

To correct this, a correction coefficient $C_I$ for the distance $d_I'$ is introduced to define.

$$d_I'' = C_I \cdot d_I' = C_I \sum_{J=1}^{L} (1 - P_{IJ}) \cdot d_{IJ} \qquad (10)$$

and using the above quantity as a criterion of inference, the voice is inferred to be $I_O$ based upon a relation, $$d_{IO}'' = M_{in}[d_1'', d_2'', d_3'', \ldots d_L'']$$

For example, the correction coefficient $C_I$ is calculated as follows (numerical values are specifically shown in the bottom row of FIG. 2) based upon $P_{IJ}$ that corresponds to 1/100 of the numerical values of FIG. 2, $$C_I = \sum_{J=1}^{M} P_{IJ} \qquad (11)$$

where M denotes the total number of the standard patterns which are prepared.

In the case of the phonemes having large $C_I$ values, there exist a lot of similar phonemes, and the distance $d_I'$ of the equation (9) tends to become small. Therefore, use of the distance $d_I''$ corrected by $C_I$ enables the phonemes to be fairly recognized.

According to the recognition experiments conducted by the inventors of the present invention, nine objects were erroneously recognized among about 100 objects when the distance $d_{IJ}$ was employed. When the distance $d_I'$ was employed, four objects were erroneously recognized. Further, when the distance $d_I''$ was employed, only one object was erroneously recognized.

FIG. 3 shows the results of recognition using the distances $d_I'$ and $d_I''$ for the four consonants of which the distance $d_{IJ}$ usually ranges from the first order to the fourth order from the smaller side in case the input voice to be recognized is a consonant /s/.

In FIG. 3, the consonant is correctly recognized as /s/ when $d_I''$ is used, even though it may be erroneously recognized as /t/ or /z/ when $d_{IJ}$ or $d_I'$ is used.

According to the above two methods, part of the standard pattern prepared based upon the compares values is selected as a candidate for recognition, and an unknown pattern is inferred from the candidates relying upon a predetermined criterion of inference.

A third method of the present invention will be described below, using a criterion of inference extracted from the combined information of input pattern and a plurality of standard patterns.

If an input pattern is denoted by i, a standard pattern by j, a degree of similarity corresponding to a compared value of the input pattern i and the standard pattern j by $d_{i,j}$, the appearing probability of the input pattern i by p(i), the probability in which the similarity degree between the input pattern i and the standard pattern j is $d_{i,j}$ by $p(d_{i,j}/i, j)$, the probability in which the input pattern is i when the similarity degree is $d_{i,j}$ by $p(i|d_{i,j})$, and the probability in which the input pattern i is compared with the standard pattern j is denoted by p(i, j), the comparison of the input pattern i with the standard pattern j indicates that the probability p(i|i, j) in which the input pattern i comes into agreement with the standard pattern j, is given by $$p(i|i,j) = p(i) \cdot p(i,j) \cdot p(d_{i,j}|i,j) \cdot p(i|d_{i,j}) \tag{12}$$

According to the conventional method, j is presumed to be equal to i, and the input pattern is specified by i which satisfies.

$$\max_i p(i|i,j) = p(i) \cdot p(i,i) \cdot p(d_{i,i}|i,i) \cdot p(i|d_{i,i}) \tag{13}$$

According to the third method of the present invention, on the other hand, the input pattern is specified by i which maximizes a relation, $$\max_i \sum_{j=1}^{N} p(i|i,j) = \tag{14}$$

$$\max_i \sum_{j=1}^{N} p(i) p(i,j) p(d_{i,j}|i,j) \cdot p(i|d_{i,j})$$

where N denotes the total number of standard patterns, using $$\sum_{j=1}^{N} p(i|i,j)$$

as a criterion of inference.

The probability p(i) can be statistically determined from the distribution of patterns. For example, the phonemes of the Japanese Language can be recognized by utilizing the results of investigation concerning the frequency of phonemes.

When all of the standard patterns and input patterns are compared, $p(i, j) = 1/N$. The probability $p(d_{i,j}|i,j)$ and the probability $p(i|d_{i,j})$ can be determined by defining the practical characteristic parameters and similarity degrees, and by observing the distribution of the data, correspondingly. The distribution of $d_{ij}$ differs depending upon the parameters and the similarity degree. When i=j, in particular, the distribution often becomes asymmetrical with respect to an average value $\bar{d}_{ij}$ of $d_{ij}$. In many cases, however, the distribution is symmetrical and can be approximated by the normal distribution. Therefore, it is virtually convenient to normalize the distribution with a dispersion $\sigma_{i,j}$ to treat it as a function of $$\delta_{i,j} = (d_{i,j} - \bar{d}_{i,j})/\sqrt{\sigma_{ij}}.$$

Therefore, if $$p(d_{i,j}|i,j) \cdot p(i|d_{i,j})$$

is approximated with the normal distribution like, $$p(d_{i,j}|i,j) \cdot p(i|d_{i,j}) = \frac{1}{\sqrt{2\pi}} e^{-\frac{\delta_{ij}^2}{2}} \tag{15}$$

the value of the equation (15) increases with the decrease in $\delta_{i,j}$. Therefore, the object which takes the sum of the equation (14) may be limited to the number n of combinations of i and j having a small value $\delta_{ij}$ (in this case, the equation (14) is treated with regard to values n smaller than the total number N). When the likelihoodration or a square distance is to be used as a similarity degree, a value among patterns having small similarity undergoes great change even for a slight change in the patterns, and becomes unstable. Due to this unstability factor, therefore, the value $\sigma_{ij}$ becomes great and an apparent value $\delta_{ij}$ becomes small. In such a case, the objects which assume the sum of the equation (14) are not simply limited to those having small value $\delta_{ij}$ but the value $d_{ij}$ itself is limited to those having increased certainty (or having small likelihoodration or distance). Even in this case, the equation (14) is executed for the output that corresponds to n standard patterns having values smaller than the total number N. Thereafter, the total number N includes the meaning of n of such a meaning.

Accordingly, it is possible to specify the input pattern using i which approximately assumes, $$\min_i \frac{1}{N} \sum_{j=1}^{N} ij = \min_i \frac{1}{N} \sum_{j=1}^{N} \frac{d_{ij} - \bar{d}_{ij}}{\sqrt{\sigma_{ij}}} \tag{16}$$

instead of the equation (14). Furthermore, if $$a_{ij} = 1/(N\sqrt{\sigma_{ij}}),$$

and the equation (16) is given by, $$\min_i \sum_{j=1}^{N} a_{ij}(d_{ij} - \bar{d}_{ij}) \tag{17}$$

there is no need of effecting the division.

Discussed below is a modification method based upon the idea of a matching method according to the above-mentioned third method utilizing the information consisting of a combination of i and j. The equation (17) is modified as follows:

$$\min_i d_{ij}' = \min_i \left( d_{ij} + \frac{w}{N-1} \sum_{j \neq i}^{N} a_{ij}(c_0 - d_{ij}) \right) \tag{18}$$

where w denotes the weight, and $a_{ij}$ and $c_O$ denote constants.

Here, $a_{ij}$ is defined as follows:

$$a_{ij} = c_{ij} - c_O \tag{19}$$

with the average value of $d_{ij}$ as $c_{ij}$ ($c_{ij} = \bar{d}_{ij}$). The constant $c_O$ is so determined that $d_{ij}$ does not usually become greater than it when the input pattern i and the standard pattern j have commonness with regard to some nature, and that $d_{ij}$ does not become smaller than it when the input pattern i and the standard pattern j do not have commonness. If the constant $c_O$ is determined as mentioned above, $a_{ij}(c_O - d_{ij})$ in the equation (18) assumes a negative value in most cases when the input pattern i and the standard pattern j have commonness in regard to some nature, and assumes a positive value in most cases when there is no commonness between i and j. Therefore, the second term of the equation (18), i.e., $$\frac{w}{N-1} \sum_{j \neq i}^{N-1} a_{ij} \cdot (c_0 - d_{ij})$$

works to correct the result $d_{ij}$ of the j-th matching portion depending upon the degree of commonness to the result $d_{ij}$ of other matching portions. In particular cases, it is allowable to set that $a_{ij}=0$. In this case, operation for the correction term for the combination can be eliminated to reduce the quantity of operation. When the phonemic commonness is very small, the value $d_{ij}$ will often become unstable. For such combinations, therefore, the value $a_{ij}$ should be set to 0 beforehand to obtain stable results. Further, the value $d_{ij}$ which is greater than a predetermined level will not be reliable. Therefore, it is better not to use the term thereof.

Described below is a further specific illustration of the principle of the third method when it is adapted for recognizing voices, particularly for recognizing phonemes in continuous voice.

FIG. 4 is a block diagram of the apparatus for recognizing voice based upon the above-mentioned principle. FIG. 4 principally illustrates a matching portion which executes the operation of the equation (14) to illustrate the principle of the third method of the present invention, and shows the flow of signals. The input voice 1 is converted into characteristic parameters through an analyzing circuit 2, and is sent to identifying circuits 3-1 to 3-N for checking with standard pattern memories 4-1 to 4-N of each of the phonemes. Results 5-1 to 5-N of checking or identification with the phonemes are sent to matching circuits 6-1 to 6-N. Utilizing the results 5-1 to 5-N of checking with the phonemes, matching circuits 6-1 to 6-N perform calculations corresponding to each of the terms of the equation (14), whereby results 7-1 to 7-N are sent to a discriminating circuit 8. The discriminating circuit 8 compares the results, discriminates the phoneme having the highest degree of certainty, and produces a signal 9.

A first system in the third method based upon the equation (4) is illustrated below.

Likelihoodration of the tenth order in used as the degree of similarity.

First, the registered unit of a standard pattern consists of vowel—consonant—vowel (a so-called VCV unit). This unit need not be limited to the VCV unit provided it is lower than a level of linguistic signs of voices such as syllable or phoneme.

According to the results of recognition experiments conducted by the inventors of the present invention, a distance in the VCV that is a correct answer does not become greater than a minimum distance in all of the candidate VCV's by more than 0.2, when the sampling frequency of the input voice is 8 KHz, the Hamming window in a continuous non-linear matching (usually called continuously DP matching) using the dynamic programming method is 20 msec, and the distance among the frames is 10 msec. Further, the distance seldom exceeds 2.0 in the VCV that serves as a correct answer. When 2.0 is exceeded, the distance should be rejected as it stems from unstable inputs. Therefore, the $d_{ij}$ which is not greater than those having the greatest certainty by more than 0.4 and which is smaller than 2.0, is used. Below are described the results $d_{ij}$ produced by the identifying circuits 3-1 to 3-N for /k/ after the input voice /Kagakuhooteishiki/.

First place: /g/ 1.634

Second place: /k/ 1.774
Third place: /b/ 1.910
Fourth place: /p/ 1.927

Figure 5:
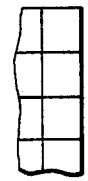
FIG. 5 is a diagram showing an example of average similarity between an input pattern (i) and a standard pattern (j)
Figure 5:
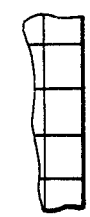
Figure 5:
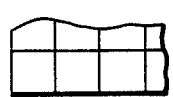
Figure 5:
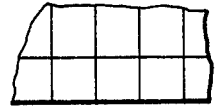
Figure 5:

In the equation (17), if a value $d_{ij}$ is measured as shown in FIG. 5, and if the dispersion $\sigma_{ij}$ is presumed to be 1, then, First place: /k/ 0.847/4
Second place: /p/ 1.433/4
Third place: /b/ 2.237/4
Fourth place: /g/ 3.067/4

Thus, /k/ becomes the first place.

Below is mentioned a modified method based on the equation (18) as a second embodiment of the third method.

When,

First place: /g/ 1.634
Second place: /k/ 1.774
Third place: /b/ 1.910
Fourth place: /p/ 1.927 if $C_0=2.2$, $W=1.0$, and $C_{ij}$ is given as shown in FIG. 5, $d_{ij}'$ after being corrected becomes:

First place: /k/ 1.672
Second place: /g/ 1.839
Third place: /p/ 1.927
Fourth place: /b/ 1.997 and the correct answer /k/ takes the first place.

Below is mentioned an apparatus for recognizing the voice according to the present invention with reference to the situation when the voice is to be recognized, particularly when the phoneme in the continuous voice is to be recognized.

Figure 6:
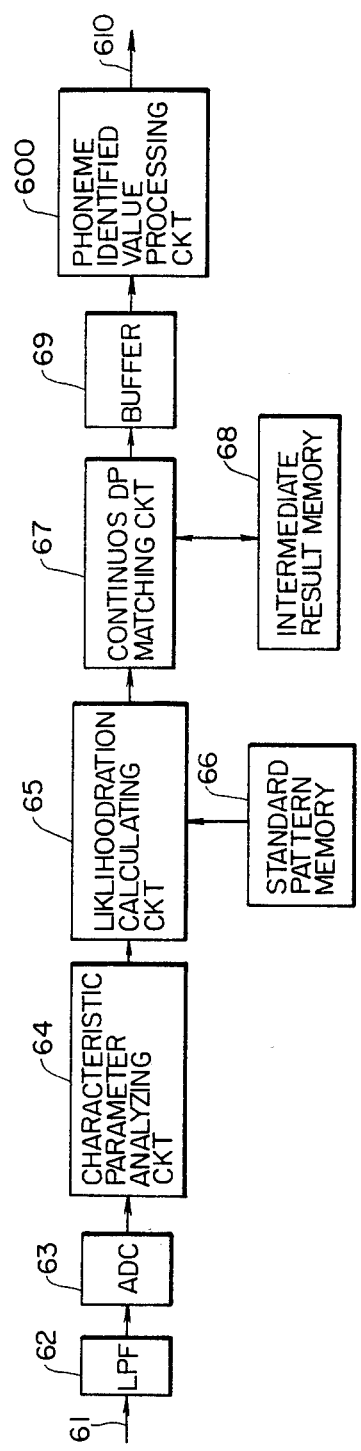
FIG. 6 is a block diagram of a voice recognition apparatus according to an embodiment of the present invention.

FIG. 6 is a block diagram of an apparatus for recognizing the voice according to an embodiment of the present invention.

In FIG. 6, an input voice 61 passes through a lowpass filter (LPF) 62 for preventing aliasing noise, and is converted into digital signals through an analog-to-digital converter (ADC) 63. Then, a conventional characteristic parameter analyzing circuit 64 produces a frame data consisting of a short-term autocorrelation $[v_i]$ and a residual power $P_O$ as a characteristic parameter after every interval of one frame (for example, 10 msec.).

Likelihoodration which represents the similarity between a series of frame data and a series of frame data of standard patterns stored in a standard pattern memory 66, is calculated by a likelihoodration calculating circuit 65.

Based upon the thus calculated likelihoodration, an optimum identified value is processed by a conventional continuous DP matching circuit 67 via an intermediate result memory 68, thereby to calculate the distance $[d_{JJ}]$.

The distance $[d_{JJ}(J=1, 2, \ldots)]$ is fed to a phoneme identified value processing circuit 600 via a buffer 69 where the recognition processing is carried out according to the method of the present invention, and a final result 610 of the processing of phoneme recognition is produced.

Figure 7:
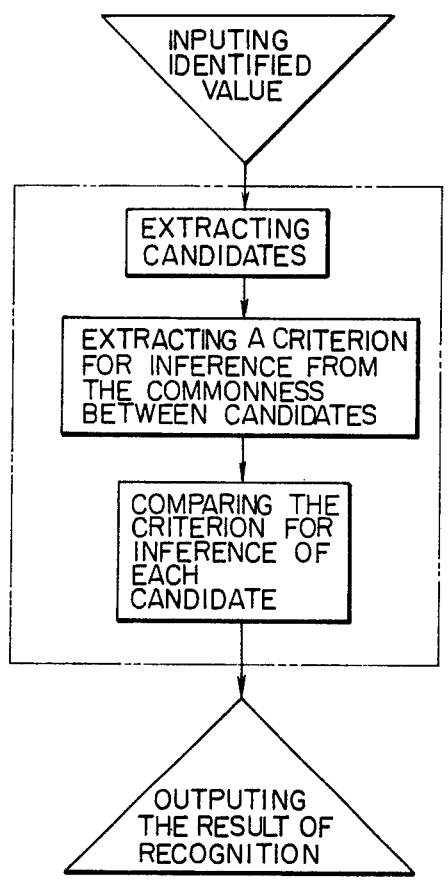
FIG. 7 is a diagram showing a flow chart for checking phonemes according to the first and second methods of the present invention.
Figure 8:
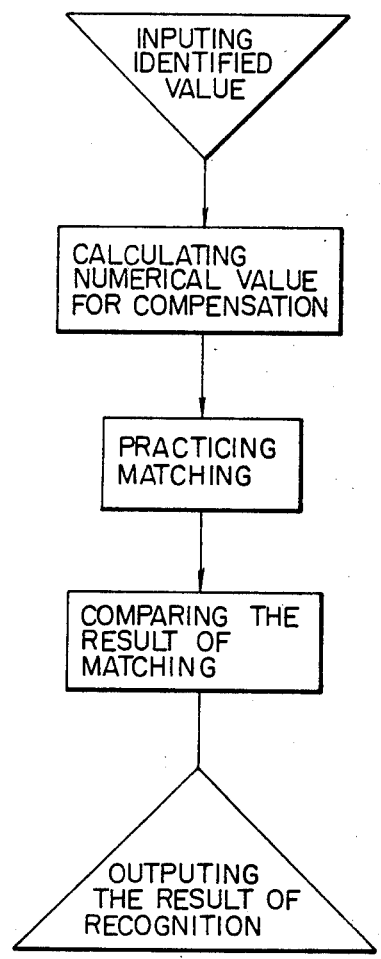
FIG. 8 is a flow chart for checking phonemes according to the third method of the present invention.

Here, and phoneme identified value processing circuit 600 may be made up of an ordinarily used microprocessor. When the first and second methods of the present invention are to be carried out using the microprocessor, however, portions surrounded by a dotted line are executed as shown in the flow chart of FIG. 7. Further, when the third method of the present invention is to be performed, the processing is carried out as shown in a flow chart of FIG. 8.

The foregoing description has employed likelihoodration as a scale for measuring the similarity. Therefore, the circuits subsequent to the continuous DP matching circuit 67 in FIG. 6 perform such a processing that the certainty increases with the decrease in the value. The same also holds true even when the distance is used as a scale for measuring the similarity.

When the correlation is to be used, however, the processing must be carried out in a way that the certainty increases with the increase in the value. For example, the reliability must be increased with the increase in the weighing quantities $w_1$, $w_2$ and $w_3$ in the equation (2). The present invention naturally includes these modifications.

According to the present invention as illustrated in the foregoing, the voice such as phonemes can be stably and precisely recognized on a level lower than a linguistic level of signs, presenting great effects.

What is claimed is:

1. A machine implemented pattern recognition method comprising comparing input patterns with standard patterns, selecting a plurality of candidates that are likely to be input patterns according to identified values that represent the results of the comparison, and inferring an input pattern among the selected candidates that are likely to be input patterns according to a predetermined criterion of inference which is determined from the commonness of the nature of each of the selected candidates with the other selected candidates.

2. A machine implemented pattern recognition method according to claim 1, wherein said criteron of inference is a number of candidates having a nature common to that of said selected candidates, and a candidate having the greatest number of said candidates having a nature common to that of said selected candidate is inferred as the input pattern.

3. A pattern recognition method according to claim 1, wherein said criterion of inference is a product of a value which corresponds to an inverse number of the candidates having a nature common to that of said selected candidates, a value corresponding to said identified value of each of the candidates, and an average value of said identified value in each of the candidates and in the candidates having a nature common to said each of the candidates.

4. A pattern recognition method according to claim 1, wherein said criterion of inference is a value corresponding to a weighed average value of a similarity degree and an identified value between said selected candidates and candidates having a nature common to said candidates.

5. A pattern recognition method according to claim 1, wherein said criterion of inference assumes a quantity given by $$\sum_{j=1}^{N} p(i) \cdot p(d_{i,j}|i,j) \cdot p(i|d_{i,j}) \cdot p(i,j)$$

where p(i) denotes an appearing probability of the input pattern i (i=1, 2, ... N), $p(d_{i,j}|i,j)$ denotes a probability in which a quantity corresponding to the similarity degree between the input pattern i and the standard pattern j (j=1, 2, ... N) is $d_{i,j}$, p $(i|d_{i,j})$ denotes a probability in which the input pattern is i when the quantity corresponding to said similarity degree is $d_{i,j}$, and p (i,j) denotes a probability in which an input pattern i is checked with a standard pattern j.

6. A machine implemented pattern recognition method for inferring an input pattern comprising the steps:
   comparing an input pattern with a plurality of standard patterns;
   selecting a plurality of candidates that are likely to be the input pattern based upon identified values that represent the results of the comparison of the input pattern with the standard patterns; and
   inferring an input pattern from the plurality of candidates based upon a predetermined criterion of inference for evaluating the selected plurality of candidates, the predetermined criterion of inference being different than the criteria for selecting the plurality of candidates, and utilizing at least one characteristic parameter of each of the selected plurality of candidates and the commonness of at least one characteristic parameter within each selected candidate and the other remaining selected candidates.

7. A machine implemented pattern recognition method in accordance with claim 6, wherein said criterion of inference is determined for each of said selected candidates by calculating the number of candidates having a characteristic parameter common to each selected candidate and the input pattern is inferred by chosing the candidate having the greatest calculated number.

8. A machine implemented pattern recognition method according to claim 6, wherein said criterion of inference is a product of a value which corresponds to an inverse number of the candidates having a characteristic parameter common to that of said selected candidates, a value corresponding to said identified value of each of the candidates, and an average value of said identified value in each of the candidates and in the candidates having a characteristic parameter common to said each of the candidates.

9. A machine implemented pattern recognition method according to claim 6, wherein said criterion of inference is a value corresponding to a weighed average value of a similarity degree and an identified value between said selected candidates and candidates having a characteristic parameter common to said candidates.

10. A machine implemented pattern recognition method according to claim 6, wherein said criterion of inference assumes a quantity given by $$\sum_{j=1}^{N} p(i) \cdot p(d_{i,j}|i,j) \cdot p(i|d_{i,j}) \cdot p(i,j)$$

where p(i) denotes an appearing probability of the input pattern i (i=1, 2, ... N), $p(d_{i,j}|i,j)$ denotes a probability in which a quantity corresponding to the similarity degree between the input pattern i and the standard pattern j (j=1, 2, ... N) is $d_{i,j}$, p $(i|d_{i,j})$ denotes a probability in which the input pattern is i when the quantity corresponding to said similarity degree is $d_{i,j}$, and p (i,j) denotes a probability in which an input pattern i is checked with a standard pattern j.

11. A voice pattern machine implemented method comprising: a first step of comparing an unknown input pattern with prestored standard voice patterns using a distance measure to find probable candidates and a second step of inferring the unknown pattern from the plurality of candidates based on a predetermined criterion of inference relying upon the common nature of the selected candidates with other candidates, wherein said criterion of inference is determined for each of said selected candidates by calculating the number of candidates having a characteristic parameter common to each selected candidate and the input pattern is inferred by choosing the candidate having the greatest calculated number.

12. A voice pattern machine implemented method comprising: a first step of comparing an unknown input pattern with prestored standard voice patterns using a distance measure to find probable candidates and a second step of inferring the unknown pattern from the plurality of candidates based on a predetermined criteron of inference relying upon the common nature of the selected candidates with other candidates, wherein said criteron of inference is a product of a value which corresponds to an inverse number of the candidates having a characteristic parameter common to that of said selected candidates, a value corresponding to said identified value of each of the candidates, and an average value of said identified value in each of the candidates and in the candidates having a characteristic parameter common to said each of the candidates.

13. A voice pattern machine implemented method comprising: a first step of comparing an unknown input pattern with prestored standard voice patterns using a distance measure to find probable candidates and a second step of inferring the unknown pattern from the plurality of candidates based on a predetermined criterion of inference relying upon the common nature of the selected candidates with other candidates, wherein said criterion of inference is a value corresponding to a weighed average value of a similarity degree and an identified value between said selected candidates and candidates having a characteristic parameter common to said candidates.

14. A voice pattern machine implemented method comprising: a first step of comparing an unknown input pattern with prestored standard voice patterns using a distance measure to find probable candidates and a second step of inferring the unknown pattern from the plurality of candidates based on a predetermined criterion of inference relying upon the common nature of the selected candidates with other candidates, wherein said criterion of inference assumes a quantity given by $$\sum_{j=1}^{N} p(i) \cdot p(d_{i,j}/i,j) \cdot p(i/d_{i,j}) \cdot p(i,j)$$

where p(i) denotes an appearing probability of the input pattern i (i=1, 2, ... N), $p(d_{i,j}/i,j)$ denotes a probability in which a quantity corresponding to the similarity degree between the input pattern i and the standard pattern j (j=1, 2, ... N) is $d_{i,j}$, $p(i/d_{i,j})$ denotes a probability in which the input pattern is i when the quantity corresponding to said similarity degree is $d_{i,j}$, and p (i,j) denotes a probability in which an input pattern i is checked with a standard pattern j.

* * * * *